United States Patent
Jönsson et al.

(10) Patent No.: US 9,552,663 B2
(45) Date of Patent: Jan. 24, 2017

(54) METHOD AND SYSTEM FOR VOLUME RENDERING OF MEDICAL IMAGES

(71) Applicant: ContextVision AB, Linköping (SE)

(72) Inventors: Daniel Jönsson, Norrköping (SE); Erik Sundén, Linghem (SE); Gunnar Láthén, Linköping (SE); Isabelle W. Hachette, Linköping (SE)

(73) Assignee: CONTEXTVISION AB, Linköping (SE)

( * ) Notice: Subject to any disclaimer, the term of this patent is extended or adjusted under 35 U.S.C. 154(b) by 163 days.

(21) Appl. No.: 14/547,934

(22) Filed: Nov. 19, 2014

(65) Prior Publication Data

US 2016/0140770 A1     May 19, 2016

(51) Int. Cl.
*G06T 15/08*     (2011.01)

(52) U.S. Cl.
CPC ........... *G06T 15/08* (2013.01); *G06T 2200/04* (2013.01); *G06T 2207/10012* (2013.01); *G06T 2207/10136* (2013.01); *G06T 2210/41* (2013.01)

(58) Field of Classification Search
CPC ..................................................... G06T 15/08
See application file for complete search history.

(56) References Cited

U.S. PATENT DOCUMENTS

| | | |
|---|---|---|
| 2007/0008317 A1 | 1/2007 | Lundstrom |
| 2011/0063288 A1 | 3/2011 | Valadez |
| 2014/0232719 A1* | 8/2014 | Wahrenberg ........... G06T 15/506 345/424 |
| 2015/0116323 A1* | 4/2015 | Buckton ................. G06T 19/00 345/424 |

FOREIGN PATENT DOCUMENTS

| | | |
|---|---|---|
| EP | 1 643 453 A1 | 4/2006 |
| WO | WO 2013/144794 A2 | 10/2013 |

OTHER PUBLICATIONS

Descoteaux et al., "Bone Enhancement Filtering: Application to Sinus Bone Segmentation and Simulation of Pituitary Surgery," MICCAI, LNCS, vol. 3749, pp. 9-16, 2005.

* cited by examiner

*Primary Examiner* — Daniel Hajnik
(74) *Attorney, Agent, or Firm* — Birch, Stewart, Kolasch & Birch, LLP (57) ABSTRACT

Methods and systems for generating images including one or more anatomical objects imaged in a volume data set are provided. Volume data from a 3D or 4D ultrasound imaging system is obtained, wherein the volume data represents structures inside a body of a subject. Then, data values of selected positions in the volume data along a viewing direction are mapped to a color and opacity. Predetermined tissue similarity values for the selected positions in the volume data are obtained, wherein the tissue similarity value is associated with a selected tissue or structure. For example, the tissue or structure may be blood vessels, bone, or organs such as a liver. The opacity and lighting for each particular position is then modified based on the obtained predetermined tissue similarity value and, finally, one or more images including the selected positions representing the selected tissue or structure are generated.

26 Claims, 5 Drawing Sheets

METHOD AND SYSTEM FOR VOLUME RENDERING OF MEDICAL IMAGES

TECHNICAL FIELD

The present invention relates generally to volume rendering of medical images. More particularly, the present invention relates to methods and systems for volume rending of medical images obtained using ultrasound imaging systems.

BACKGROUND OF THE INVENTION

In the medical field, three-dimensional (3D) image data sets, i.e. volume data sets, are collected by a variety of techniques—referred to as modalities in the field—including ultrasound, computed tomography (CT), and magnetic resonance (MR). Ultrasound images has no absolute grey scale in contrast to, for example, CT where Hounsfield (HU) values define different anatomical structures. This makes classification of tissue difficult in ultrasound imaging. Nevertheless, the use of ultrasound to produce images for medical monitoring and diagnosis has become wide spread to a large extent as a result from its nonionizing nature and its ability to produce images resulting from the inherent differences in mechanical properties of various soft tissues. Typical and common applications include examination and monitoring of the heart, abdomen and fetus. In most areas, diagnosis is now generally based on the size, position, contour and motion of the studied structures as well as on their relative transmission and reflection properties.

When displaying an image, such as in medical imaging applications, particular signal values are associated with particular opacities and also, in case of non-grayscale images, colors to assist visualization. This association or mapping is performed when using data from a 3D data set (voxel data) to compute a 2D data set (pixel data set) which represents a 2D projection of the 3D data set for display on a computer screen or other conventional 2D display apparatus.

Volume data sets contain a larger data quantity than image data sets of 2D images, which is why an evaluation of volume data sets is relatively time-consuming. Therefore, procedures which aid the user in reducing data are necessary and one effective process is known as volume rendering or more generally rendering. In volume rendering, the values in the 3D data set are visualized by a compositing process (projection) along a view direction. The entire depth of the imaged body is thereby acquired. However, details of small objects or structures and especially objects shown in thin layers may be lost and different objects having a similar density may be difficult to separate from each other. The representation is manually characterized by adjustment of "transfer functions". Illumination effects can be used to improve the visibility of the images.

U.S. Pat. No. 7,457,816 to Barth discloses a method for depicting objects displayed in a first volume data set using volume rendering. A second volume data set is generated in which the volume elements of the first volume data set are modulated and/or coded dependent on a root mean squared depth, parallel to the main observation direction running in the first volume data set. Thereafter, a volume rendering is applied on the second data set.

However, there is still a need within the field of improved methods and systems for volume rendering of medical images and of improved methods and systems for volume rending of medical images obtained using ultrasound imaging systems.

SUMMARY OF THE INVENTION

According to an object of the present invention, there is provided improved methods and systems for volume rending of medical images.

According to other objects of the present invention, there is provided improved methods and systems for volume rending of medical images obtained using ultrasound imaging systems According to further objects of the present invention, there is provided improved methods and systems for presenting medical images with a high degree of visibility and clarity.

According to further objects of the present invention, there is provided improved methods and systems for presenting medical ultrasound images with a high degree of visibility and clarity.

These and other objects are achieved in accordance with the appended claims.

According to an aspect of the present invention, there is provided a method for generating images including one or more anatomical objects imaged in a volume data set. Volume data from a 3D or 4D ultrasound imaging system is obtained, wherein the volume data represents structures inside a body of a subject. Then, data values of selected positions in the volume data along a viewing direction are mapped to a color and opacity. Predetermined tissue similarity values for the selected positions in the volume data are obtained, wherein the tissue similarity value is associated with a selected tissue or structure. For example, the tissue or structure may be blood vessels, bone, or organs such as a liver. The opacity for each particular position is then modified based on the obtained predetermined tissue similarity value and, finally, one or more images including the selected positions representing the selected tissue or structure are generated.

According to a further aspect of the present invention, there is provided a method for generating images including one or more anatomical objects imaged in a volume data set. Volume data from a 3D or 4D ultrasound imaging system are obtained, wherein the volume data represents structures inside a body of a subject. Data values in the volume data of selected positions are mapped along a viewing direction to a color and opacity and predetermined skeletal similarity values for the selected positions in the volume data are obtained, wherein the predetermined skeletal similarity value is associated with bone. Then, opacity for each particular selected position is modified based on the predetermined skeletal similarity value. Finally, one or more images including the positions representing bone are generated.

According to another aspect of the invention, there is provided a system for generating medical images including one or more anatomical objects imaged in a volume data set. The system comprises a display for displaying medical images and a controller unit coupled to the display. The controller unit is configured to obtain volume data from a 3D or 4D ultrasound imaging system, wherein the volume data represents structures inside a body of a subject, and to map selected positions in the volume data along a viewing direction to a color and opacity. Further, the controller unit is configured to obtain predetermined tissue similarity value for the selected positions in the volume data, wherein the tissue similarity value is associated with a selected tissue or structure. For example, the tissue or structure may be blood vessels, bone, or organs such as a liver. The controller unit is moreover configured to modify opacity for each particular selected position based on the predetermined tissue similarity value and to provide data for generation of one or more medical images including the selected positions representing the selected tissue or structure.

According to yet another aspect of the present invention there is provided a system for generating medical images including one or more anatomical objects imaged in a volume data set. The system comprises a display for displaying medical images and a controller unit coupled to the display. The controller unit is configured to obtain volume data from a 3D or 4D ultrasound imaging system, wherein the volume data represents structures inside a body of a subject, and to map selected positions in the volume data to a color and opacity. Further, the controller unit is configured to obtain predetermined skeletal similarity values for the selected positions in the volume data, to modify opacity for each particular selected position based on the predetermined skeletal similarity value and to provide data for generation of one or more medical images including the positions representing bone.

Today, ultrasound in Women's health is used for studying solid internal organs and fetuses during pregnancy in all three trimesters. Conditions, disorders, and diseases typically identified are fetal abnormalities and disease, nodules, swelling or infection. The present invention provides several advantages. For example, improved diagnosis of skeletal malformations or detection of low bone mineralization rate (osteopenia). The method provides conspicuous skin line definition that facilitates diagnosis of spina bifida. Furthermore, the present invention enables improved accuracy in measurements of distance between vertebrae in spine and length of ribs. Major benefits are possibility to interpret solid organs' size and structure safely and accurately.

According to embodiments of the present invention, opacity of selected positions likely to represent the selected tissue or structure, for example bone in a case where skeletal similarity is used, is maintained and opacity is reduced for selected positions representing other tissue or structures, i.e. other tissues and structures than bone in the case where skeletal similarity is used.

According to embodiments of the present invention, a light calculation for selected positions in the volume data along a viewing direction is performed depending on the predetermined tissue similarity value for each particular selected position. In embodiments of the present invention, the light calculation comprises applying a first light modifying function on selected positions likely to represent the selected tissue or structure and applying a second light modifying function on selected positions likely to represent other tissue or structures.

In further embodiments of the present invention, the first light modifying function comprises diffuse and specular shading and the second light modifying function comprises diffuse shading.

According to yet other embodiments of the present invention, positions in the volume along ray cast lines originating from a view point are mapped to a color and opacity. Further, predetermined tissue similarity values for the positions in the volume data along the ray cast lines are obtained and opacity for each particular position is modified based on the predetermined tissue similarity value, wherein opacity of positions likely to represent bone is maintained and opacity of positions representing other structures is reduced.

According to embodiments of the present invention, the skeletal similarity is based on one or more feature volumes. The first feature volume is the data values themselves, for which bone is identified by data values above a specific threshold. The second feature volume is a structural measure for which bone is characterized by structures which are non-flat. The structural measure is based on a structure tensor, for which there are three associated eigenvalues. The structural measure indicating non-flatness is computed based on the difference between the two largest eigenvalues.

Further advantageous embodiments of the device according to the present invention and further advantages with the present invention emerge from the dependent claims and the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF EMBODIMENTS

In the drawings, similar or corresponding elements are denoted by the same reference numbers.

Figure 1:
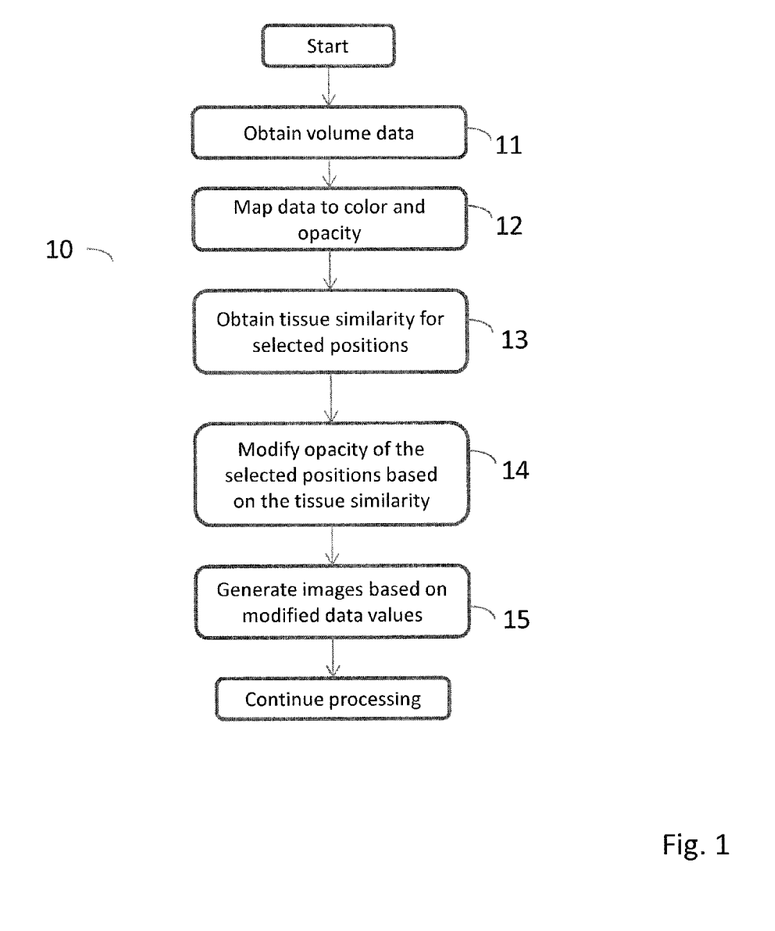
FIG. 1 is a flow diagram of a method for volume rendering using skeletal similarity according to an embodiment of the present invention.

FIG. 1 is flow diagram view of a method 10 for volume rendering using tissue similarity according to an embodiment of the present invention. The method of volume rendering according to the present invention generally comprises obtaining volume data from a 3D or 4D ultrasound imaging system at a step 11, wherein the volume data represents anatomical structures or objects inside a body of a subject such as a patient. In embodiments of the present invention, the 3D or 4D ultrasound imaging system obtaining data comprises obtaining data from a source such as for example 3D ultrasound arrays or real-time 3D imaging. In a next step 12, data values in the volume data for selected positions or, in alternative embodiments, along ray cast lines originating from a view point, are mapped to a color and opacity using, for example, a Look-Up-Table (LUT).

The method 10 further includes, in step 13, obtaining predetermined tissue similarity values for the selected positions in the volume data or, as in alternative embodiments, positions along the ray cast lines. A tissue similarity is obtained for each position in the volume and the tissue similarity determines or indicates a probability that a particular data value at a particular location or position in the volume represents a selected tissue. Thus, at each position in the volume it is possible to look-up the original data value as well as the tissue similarity. For example, the tissue may be blood vessels, bone or organs such as the liver. In embodiments of the present invention, a skeletal similarity is used and the skeletal similarity determines or indicates a probability that a particular data value at a particular location position in the volume represents bone. Thus, at each position in the volume it is possible to look-up the original data value as well as the skeletal similarity.

In embodiments of the present invention, the skeletal similarity is based on one or more feature volumes. The first feature volume is the data values themselves, for which bone is identified by data values above a specific threshold. The second feature volume is a structural measure for which bone is characterized by structures which are non-flat. The structural measure is based on a structure tensor, for which there are three associated eigenvalues. The structural measure indicating non-flatness is computed based on the difference between the two largest eigenvalues.

Moreover, the method 10 includes modifying 14 the opacity for each particular position based on the predetermined tissue similarity value, e.g. if skeletal similarity is used the opacity for bone is modified. In embodiments of the present invention, the opacity of positions likely to represent a selected tissue is maintained and positions representing other structures are given a reduced opacity. For example, the modified opacity can be determined by multiplying the original opacity of a particular voxel with the skeletal similarity for that particular position. This will result in a maintained opacity for positions (or voxels) having a high probability of being bone and in a reduced opacity or transparency of other anatomical structures than bone.

Thereafter, at step 15, one or more images including the positions representing the selected tissue, i.e. bone, are generated and may be displayed.

Figure 2:
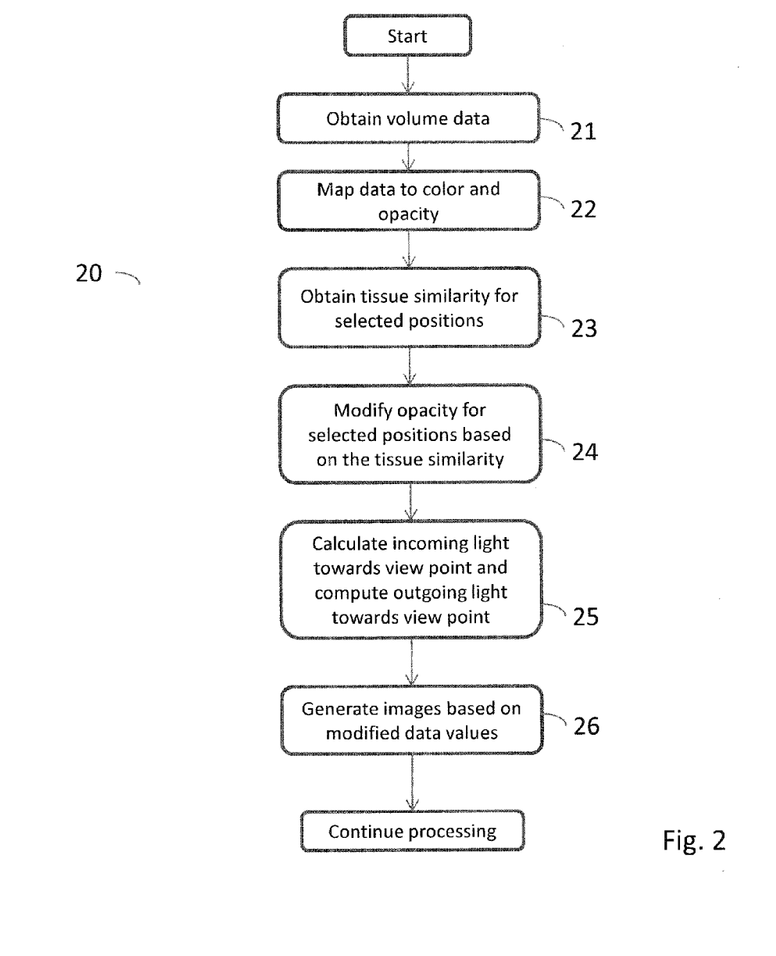
FIG. 2 is a flow diagram of a method for volume rendering using skeletal similarity according to another embodiment of the present invention.

Turning now to FIG. 2, another embodiment of a method 20 for volume rendering using tissue similarity according to the present invention will be described. The method of volume rendering according to the present invention generally comprises obtaining volume data from a 3D or 4D ultrasound imaging system at a step 21, wherein the volume data represents anatomical structures or objects inside a body of a subject such as a patient. In embodiments of the present invention, the 3D or 4D ultrasound imaging system obtaining data comprises obtaining data from a source such as for example 3D ultrasound arrays or real-time 3D imaging. In a next step 22, data values in the volume data for selected position or, in alternative embodiments, along ray cast lines originating from a view point, are mapped to a color and opacity using, for example, a Look-Up-Table (LUT).

The method 20 further includes, in step 23, obtaining predetermined tissue similarity values for the selected positions in the volume data or, as in alternative embodiments, positions along the ray cast lines. A tissue similarity is obtained for each position in the volume and the tissue similarity determines or indicates a probability that a particular data value at a particular location or position in the volume or along a ray cast line represents a selected tissue. Thus, at each position in the volume it is possible to look-up the original data value as well as the tissue similarity. The tissue may be blood vessels, bone or organs such as the liver. In embodiments of the present invention, a skeletal similarity is used and the skeletal similarity determines or indicates a probability that a particular data value at a particular location position in the volume or along a ray cast line represents bone. Thus, at each position in the volume it is possible to look-up the original data value as well as the skeletal similarity.

Moreover, the method 20 includes modifying 24 the opacity for each particular position based on the predetermined tissue similarity value, e.g. if skeletal similarity the opacity for bone is modified. In embodiments of the present invention, the opacity for positions likely to represent a selected tissue is maintained and positions representing other structures are given a reduced opacity. For example, the modified opacity can be determined by multiplying the original opacity of a particular voxel with the skeletal similarity for that particular data value. This will result in a maintained opacity for voxels having a high probability of being bone and in a reduced opacity or transparency of other anatomical structures than bone.

Then, at step 25, a light calculation depending on the tissue similarity is performed for each position in the volume, or as in alternative embodiments, each position along the ray cast lines, for example, using a threshold. In an embodiment of the present invention, the tissue similarity for the respective position is compared with a threshold and if the tissue similarity for a particular position is lower than the threshold, a diffuse shading operation is performed on that voxel using an isotropic phase function. On the other hand, if the tissue similarity is higher than the threshold, a diffuse and specular shading operation is performed suing a bidirectional reflection function. Based on these operations and the modified opacity, the outgoing light towards the view point is calculated for each voxel. In embodiments of the present invention, the skeletal similarity for the respective position is compared with a threshold and if the skeletal similarity for a particular position is lower than the threshold, a diffuse shading operation is performed on that voxel using an isotropic phase function. On the other hand, if the skeletal similarity is higher than the threshold, a diffuse and specular shading operation is performed using a bidirectional reflection function. Based on these operations and the modified opacity, the outgoing light towards the view point is calculated for each voxel.

Thereafter, at step 26, one or more images including the positions representing the tissue, e.g. bone, are generated and may be displayed.

Figure 3:
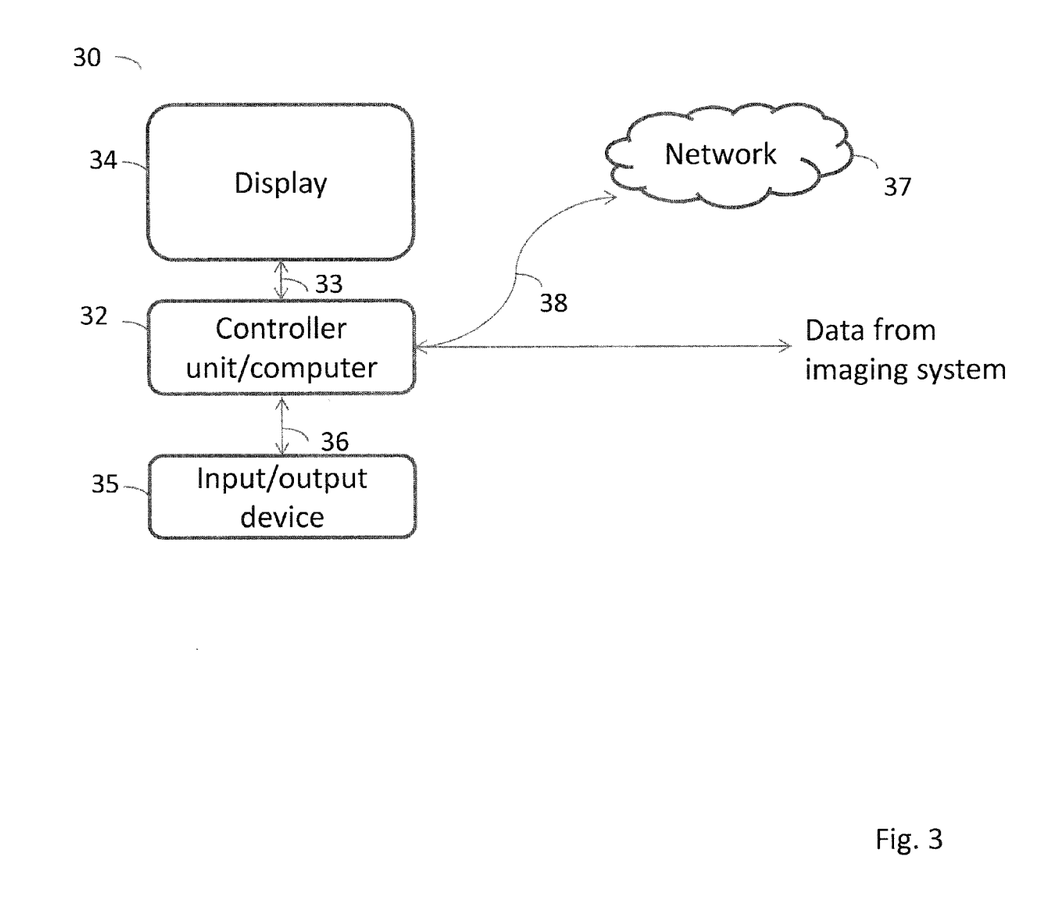
FIG. 3 is a schematic block diagram of a system for implementation of the methods of volume rendering using skeletal similarity according to the present invention.

With reference to FIG. 3, a system for implementing the methods of volume rendering using tissue similarity, e.g. skeletal similarity, according to embodiments of the present invention. The methods according to the present invention can also be implemented, for example, in a clinical workstation or system for implementing clinical tasks as well as by means of a computer program product. The system 30 includes a computer/controller unit 32 and a display 34, wherein the display is coupled to the computer/control unit 32 via suitable connection 33. Further, the system 30 includes an input/output device 35 coupled to the computer/controller unit 32 via suitable connections 36.

The input/output device 35 may include a keyboard, audio/voice input device and/or similar devices, pointing devices such as a mouse, touch screen and/or similar device.

The computer/controller unit 32 may receive and/or send data (such as 3D medical volume data obtained in an imaging procedure) from one or more of a mass storage device or media (not shown) via suitable signal coupling and/or a network 37 (i.e. for remote data acquisition, storage, analysis, and/or display) via suitable signal coupling generally indicated by reference numeral 38.

According to embodiments of the present invention, the computer/controller unit 32 is configured to obtain volume data from a 3D or 4D ultrasound imaging system, wherein the volume data represents structures inside a body of a subject. In embodiments, the 3D or 4D ultrasound imaging system is an ultrasound imaging system providing 3D ultrasound images of subjects such as patients for medical applications. Further, the computer/controller unit 32 is configured to map data values in the volume data to a color and opacity and to obtain predetermined tissue similarity values, e.g. skeletal similarity values, for the data values in the volume data. Moreover, it is determined whether the positions in the volume data represent a specific tissue, e.g. bone, using a predetermined tissue similarity value, e.g. a skeletal similarity value, for each particular position and opacity is modified for each particular position based on the predetermined tissue similarity value. In embodiments of the present invention, opacity of positions likely to represent the specific tissue is maintained and opacity of positions representing other structures than the specific tissue is reduced. Based on the modified data, one or more medical images including the positions representing the specific tissue or structure, e.g. bone, are generated and provided to the display 34.

Figure 4:
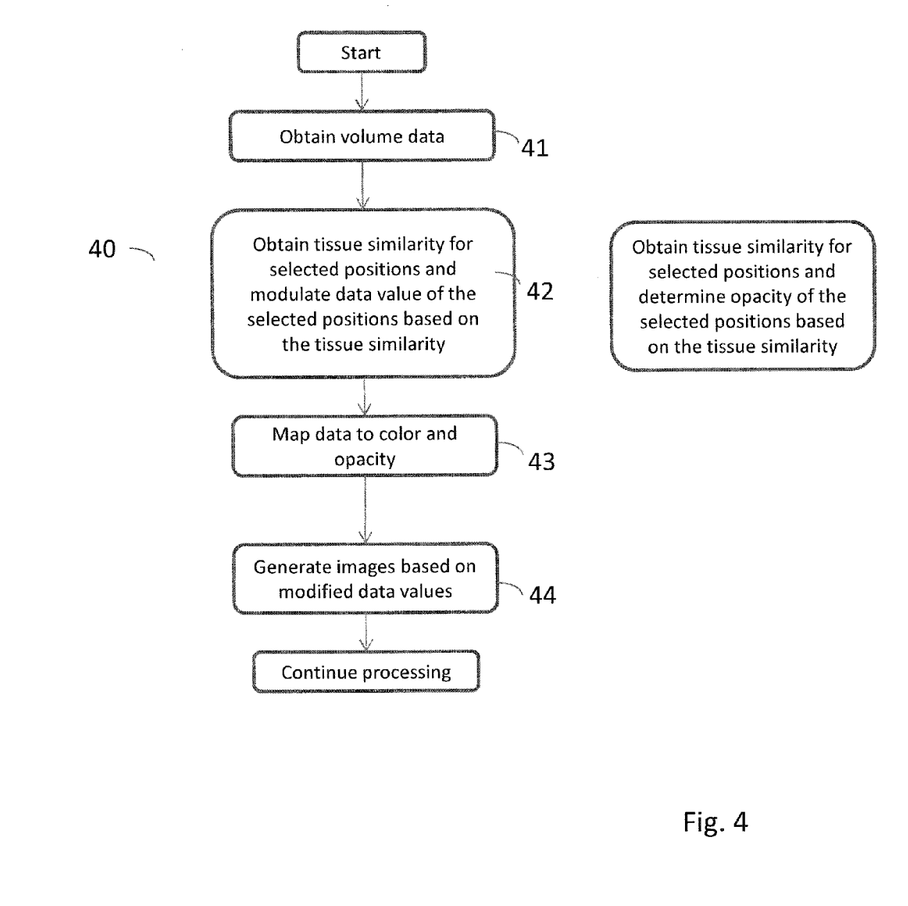
FIG. 4 is a flow diagram of a method for volume rendering using skeletal similarity according to a further embodiment of the present invention.

With reference to FIG. 4, a further embodiment of the present invention will be discussed. FIG. 4 is flow diagram view of a method 40 for volume rendering using tissue similarity according to an embodiment of the present invention. The method of volume rendering according to the present invention generally comprises obtaining volume data from a 3D or 4D ultrasound imaging system at a step 41, wherein the volume data represents anatomical structures or objects inside a body of a subject such as a patient. In embodiments of the present invention, the 3D or 4D ultrasound imaging system obtaining data comprises obtaining data from a source such as for example 3D ultrasound arrays or real-time 3D imaging. Further, in a step 42, predetermined tissue similarity values for selected positions in the volume data are obtained and the data value in each particular position is modulated based on the predetermined tissue similarity value. In embodiments of the present invention, the data value in positions likely to represent a selected tissue is maintained and data values in positions representing other structures are reduced. For example, the modulated data value can be determined by multiplying the original data value of a particular position (or voxel) with the skeletal similarity for that particular position. This will result in a maintained data value for positions having a high probability of being bone and in a reduced data value for other anatomical structures than bone.

In a next step 43, modulated data values in the volume for selected positions or, in alternative embodiments, along ray cast lines originating from a view point, are mapped to a color and opacity.

Thereafter, at step 44, one or more images including the positions representing the selected tissue, i.e. bone, are generated and may be displayed.

Figure 5:
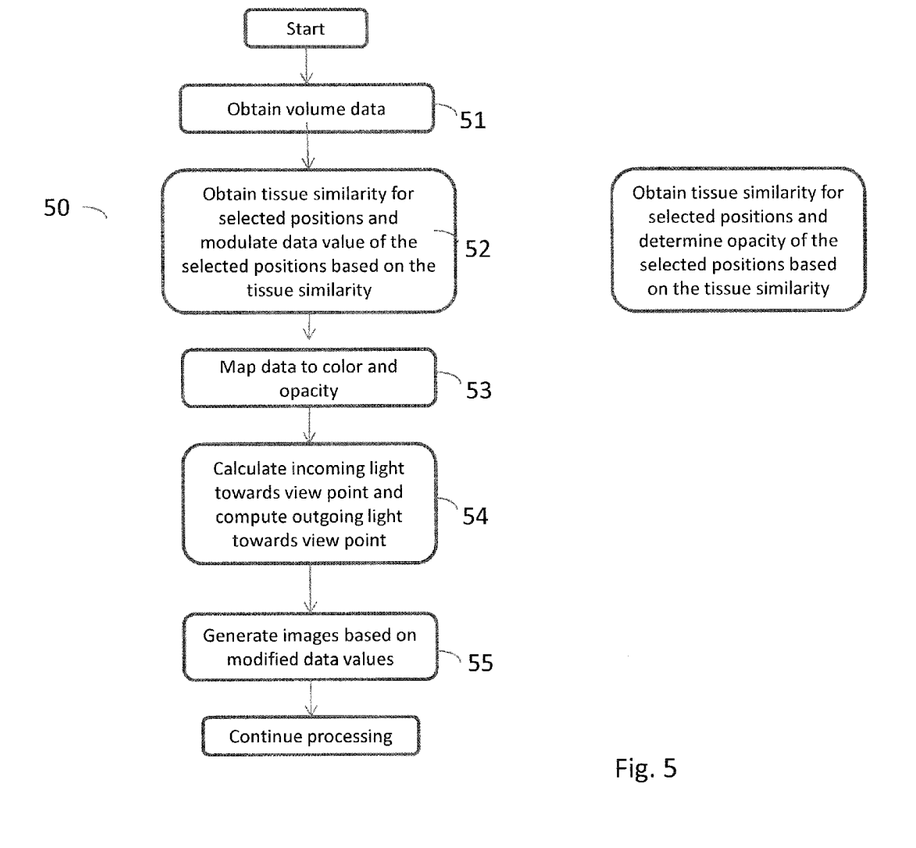
FIG. 5 is a flow diagram of a method for volume rendering using skeletal similarity according to another embodiment of the present invention.

With reference to FIG. 5, a further embodiment of the present invention will be discussed. FIG. 5 is flow diagram view of a method 50 for volume rendering using skeletal similarity according to an embodiment of the present invention. The method of volume rendering according to the present invention generally comprises obtaining volume data from a 3D or 4D ultrasound imaging system at a step 51, wherein the volume data represents anatomical structures or objects inside a body of a subject such as a patient. In embodiments of the present invention, the 3D or 4D ultrasound imaging system obtaining data comprises obtaining data from a source such as for example 3D ultrasound arrays or real-time 3D imaging. Further, in a step 52, predetermined tissue similarity values for selected positions in the volume data are obtained and the data value for each particular position is modulated based on the predetermined tissue similarity value. In embodiments of the present invention, the data value in positions likely to represent a selected tissue is maintained and data values in positions representing other structures are reduced. For example, the modulated data value can be determined by multiplying the original data value of a particular position (or voxel) with the skeletal similarity for that particular position. This will result in a maintained data value for voxels having a high probability of being bone and in a reduced data value for other anatomical structures than bone.

In a next step 53, modulated data values in the volume for selected positions or, in alternative embodiments, along ray cast lines originating from a view point, are mapped to a color and opacity.

Then, at step 54, a light calculation depending on the tissue similarity is performed for each position in the volume, or as in alternative embodiments, each position along the ray cast lines, for example, using a threshold. In an embodiment of the present invention, the tissue similarity for the respective position is compared with a threshold and if the tissue similarity for a particular position is lower than the threshold, a diffuse shading operation is performed on that voxel using an isotropic phase function. On the other hand, if the tissue similarity is higher than the threshold, a diffuse and specular shading operation is performed using a bidirectional reflection function. Based on these operations and the modified opacity, the outgoing light towards the view point is calculated for each voxel. In embodiments of the present invention, the skeletal similarity for the respective position is compared with a threshold and if the skeletal similarity for a particular position is lower than the threshold, a diffuse shading operation is performed on that voxel using an isotropic phase function. On the other hand, if the skeletal similarity is higher than the threshold, a diffuse and specular shading operation is performed using a bidirectional reflection function. Based on these operations and the modified opacity, the outgoing light towards the view point is calculated for each voxel.

Thereafter, at step 55, one or more images including the positions representing the selected tissue, i.e. bone, are generated and may be displayed.

The invention shall not be considered limited to the embodiments illustrated, but can be modified and altered in many ways by one skilled in the art, without departing from the scope of the appended claims.

The invention claimed is:

1. A method for generating images including one or more anatomical objects imaged in a volume data set comprising the steps:
   obtaining volume data from a 3D or 4D ultrasound imaging system, wherein said volume data represents structures inside a body of a subject;
   mapping data values of selected positions in said volume data to a color and opacity;
   obtaining at least one predetermined tissue similarity value for the selected positions in said volume data, wherein the tissue similarity value is associated with a specific tissue or structure, said tissue similarity value being based on at least the following feature volumes including a first feature volume consisting of the volume data values, where the specific tissue is identified by data values above a specific threshold, and a second feature volume consisting of a structural measure, where the specific tissue is characterized by structures that are non-flat, the structural measure being based on structure tensor associated with a number of eigenvalues and non-flatness is determined based on difference between the two largest eigenvalues;

modifying opacity for each particular selected position based on the predetermined tissue similarity value; and
generating one or more images including the selected positions representing the selected tissue or structure.

2. The method according to claim 1, wherein the step of modifying comprises:
maintaining opacity of selected positions likely to represent a specific tissue or structure; and
reducing opacity of selected positions representing other tissue or structures.

3. The method according to claim 1, further comprising the step of:
performing a light calculation for selected positions in said volume data depending on a predetermined tissue similarity value for each particular selected position.

4. The method according to claim 3, wherein performing a light calculation comprises applying a first light modifying function on selected positions likely to represent a specific tissue or structure.

5. The method according to claim 4, wherein performing a light calculation for comprises applying a second light modifying function on selected positions likely to represent other tissue or structures.

6. The method according to claim 5, wherein the first light modifying function comprises diffuse shading and specular shading and wherein the second light modifying function comprises diffuse shading.

7. The method according to claim 1, wherein the tissue similarity value is a skeletal similarity value and the specific tissue or structure is bone.

8. A method for generating images including one or more anatomical objects imaged in a volume data set comprising the steps:
obtaining volume data from a 3D or 4D ultrasound imaging system, wherein said volume data represents structures inside a body of a subject;
mapping data values in said volume data of selected positions to a color and opacity;
obtaining at least one predetermined skeletal similarity value for the selected positions in said volume data, wherein the predetermined skeletal similarity value is associated with bone, said skeletal similarity value being based on at least the following feature volumes including a first feature volume consisting of the volume data values, where bone is identified by data values above a specific threshold, and a second feature volume consisting of a structural measure, where bone is characterized by structures that are non-flat, the structural measure being based on structure tensor associated with a number of eigenvalues and non-flatness is determined based on difference between the two largest eigenvalues;
modifying opacity for each particular selected position based on the predetermined skeletal similarity value; and
generating one or more images including the positions representing bone.

9. The method according to claim 8, wherein the step of modifying comprises:
maintaining opacity of selected positions likely to represent bone; and
reducing opacity of selected positions representing other tissue or structures.

10. The method according to claim 8, further comprising the step of:
performing a light calculation for selected positions in said volume data depending on the predetermined skeletal similarity value for each particular selected position.

11. The method according to claim 10, wherein performing a light calculation comprises applying a first light modifying function on selected positions likely to represent bone.

12. The method according to claim 11, wherein performing a light calculation comprises applying a second light modifying function on the selected positions likely to represent other structures than bone.

13. The method according to claim 12, wherein the first light modifying function comprises diffuse shading and specular shading and wherein the second light modifying function comprises diffuse shading.

14. A system for generating medical images including one or more anatomical objects imaged in a volume data set comprising:
a display for displaying medical images; and
a controller unit coupled to the display and being configured to:
obtain volume data from a 3D or 4D ultrasound imaging system, wherein said volume data represents structures inside a body of a subject;
map data values in said volume data to a color and opacity;
obtain at least one predetermined tissue similarity value for the selected positions in said volume data, wherein the tissue similarity value is associated with a specific tissue or structure, said tissue similarity value being based on at least the following feature volumes including a first feature volume consisting of the volume data values, where the specific tissue is identified by data values above a specific threshold, and a second feature volume consisting of a structural measure, where the specific tissue is characterized by structures that are non-flat, the structural measure being based on structure tensor associated with a number of eigenvalues and non-flatness is determined based on difference between the two largest eigenvalues;
modify opacity for each particular selected position based on the predetermined tissue similarity value; and
provide data for generation of one or more medical images including the positions representing the selected tissue or structure.

15. The system according to claim 14, wherein the controller unit is further configured to maintain opacity of selected positions likely to represent the specific tissue or structure and reduce opacity of selected positions representing other structures.

16. The system according to claim 14, wherein the controller unit is further configured to perform a light calculation for selected positions in said volume data depending on the predetermined tissue similarity value for each particular selected position.

17. The system according to claim 16, wherein the controller unit is further configured to apply a first light modifying function on selected positions likely to represent the selected tissue or structure.

18. The system according to claim 17, wherein the controller unit is further configured to apply a second light modifying function on selected positions likely to represent other tissue or structures.

19. The system according to claim 18, wherein controller unit is configured to apply the first light modifying function including diffuse shading and specular shading and to apply the second light modifying function including diffuse shading.

20. The system according to claim 14, wherein the tissue similarity value is a skeletal similarity value and the selected tissue or structure is bone.

21. A system for generating medical images including one or more anatomical objects imaged in a volume data set comprising:
a display for displaying medical images; and
a controller unit coupled to the display and being configured to:
obtain volume data from a 3D or 4D ultrasound imaging system, wherein said volume data represents structures inside a body of a subject;
map data values in said volume data to a color and opacity;
obtain at least one predetermined skeletal similarity value for the selected positions in said volume data, wherein the skeletal similarity value is associated with bone, said skeletal similarity value being based on at least the following feature volumes including a first feature volume consisting of the volume data values, where bone is identified by data values above a specific threshold, and a second feature volume consisting of a structural measure, where bone is characterized by structures that are non-flat, the structural measure being based on structure tensor associated with a number of eigenvalues and non-flatness is determined based on difference between the two largest eigenvalues;
modify opacity for each particular selected position based on the predetermined skeletal similarity value; and
provide data for generation of one or more medical images including the positions representing bone.

22. The system according to claim 21, wherein the controller unit is configured to maintain opacity of selected positions likely to represent bone and reduce opacity of selected positions representing other tissue or structures.

23. The system according to claim 21, wherein the controller unit is further configured to perform a light calculation for selected positions in said volume data depending on the predetermined skeletal similarity value for each particular selected position.

24. The system according to claim 23, wherein the controller unit is configured to apply a first light modifying function on selected positions likely to represent bone.

25. The system according to claim 24, wherein the controller unit is configured to apply a second light modifying function on the selected positions likely to represent other structures than bone.

26. The system according to claim 25, wherein the controller unit is configured to apply the first light modifying function including diffuse shading and specular shading and to apply the second light modifying function including diffuse.

* * * * *